United States Patent [19]

Deutsch

[11] Patent Number: 5,066,387

[45] Date of Patent: Nov. 19, 1991

[54] PROCESS FOR REMOVING FINE PARTICLES FROM A POWDER

[75] Inventor: Marshall E. Deutsch, Sudbury, Mass.

[73] Assignee: J & S Medical Associates, Inc., Natick, Mass.

[21] Appl. No.: 506,937

[22] Filed: Apr. 9, 1990

[51] Int. Cl.$^5$ .............................................. B03B 1/04
[52] U.S. Cl. ........................................................ 209/5
[58] Field of Search .................. 209/4, 5, 9; 210/729; 423/112

[56] References Cited

U.S. PATENT DOCUMENTS

| 1,029,579 | 6/1912 | Schwerin | 209/5 |
| 2,999,586 | 9/1961 | Keith | 209/5 |
| 3,630,351 | 12/1971 | Uhinck | 209/5 |
| 3,757,938 | 9/1973 | Wachtel | 209/5 |
| 3,811,848 | 5/1974 | Johnson | 44/351 |
| 3,932,596 | 1/1976 | Rohatgi | 209/9 X |
| 4,750,992 | 6/1988 | Romine | 209/5 |
| 4,767,540 | 8/1988 | Spitzer et al. | 209/5 X |

Primary Examiner—Michael S. Huppert
Assistant Examiner—Edward M. Wacyra
Attorney, Agent, or Firm—William Nitkin

[57] ABSTRACT

A process for removing finer than uniform size particles from a powder in a container including the steps of suspending the finer particles in a liquid rinse containing a charged compound such as a quanternary ammonium compound to reduce the static attraction of the finer particles from being bound to larger particles allowing the large particles to settle and decanting the suspensed finer particles in the liquid.

4 Claims, No Drawings

PROCESS FOR REMOVING FINE PARTICLES FROM A POWDER

BACKGROUND OF THE INVENTION

1. Field of the Invention

The process of this invention resides in the area of removing fine particles from larger uniform size particles in a powder and more particularly relates to a process of placing the powder in a liquid, suspending the fine particles and then decanting the suspension to remove the fine suspended particles from the powder.

2. Description of the Prior Art

In many instances it is important to have a powder containing particles of like size, and it is often necessary to remove finer particles from those particles of uniform size in such particulate material. Sieving is a common procedure to try to accomplish this result. Sieving easily removes particles larger than the sieve openings, but in many cases sieving does not totally eliminate finer particles from those of the desired uniform size because the sieving process itself can result in the formation of additional fine particles especially when the particles are of a brittle nature and rub against the screen of the sieve and against one another.

In the performance of various chemical tests, uniform particle size can be crucial for accurate results. For example, in testing the iron-binding capacity of blood serum, one can perform an iron-binding capacity test to determine the total ability of the blood serum to combine with ferric ions. The iron-binding protein in serum is known as transferrin and normally is only partially bound with iron. Testing is done to measure the total amount of iron to which the transferrin is capable of binding. A sample of a patient's serum is mixed with a solution containing excess ferric ions which ions bind to the unoccupied sites on the transferrin and this mixture is brought into contact with a material which removes any unbound ferric ions. This material may be magnesium carbonate, but it has been found that this material is inconvenient to use. A more desirable procedure is to pass the mixture through an alumina column to remove such unbound ferric ions. Any remaining bound ferric iron in the serum is determined by further testing which result represents the total iron-binding capacity of the serum when the value is calculated with corrections made for the dilution of the serum by the iron solution. The actual structure for such filtering is a column containing an alumina section in it with a receipt cup below. The serum and ferric ion mixture is placed in the column and passed through the alumina into the cup for further testing. Alumina, also known as aluminum oxide, must be of a particle size that is uniform for the test to be accurate. Usually the aluminum oxide powder used in this test, even if previously sieved, contains undesired fine particles. It is these remaining fine particles that must be removed to have an alumina product of uniform particle size for highly accurate test results. It should be noted that although an example is given above for testing the iron-saturating ability of serum and its total iron-binding capacity, the process for removing fine particles of this invention can be utilized in a variety of other types of processes for producing a powder material of uniform particle size. The problem with sieving, as mentioned in the example above, is that the aluminum oxide particles can rub against the screen of the sieve and against each other, such as during shipping, causing the particles to break apart, since they are brittle, into smaller particles. Even when purchasing bulk amounts of pre-sized particles which are available as sieved factions, that is material which will pass through one size of sieve but not through another smaller size, one does not avoid the problem. One still encounters the undesired finer particles.

In the prior art this removal is accomplished by suspending the powder in a liquid such as water and letting the powder partially settle. One then discards the finer, lighter particles floating in the liquid by decantation as many smaller particles remain suspended for a period of time in the liquid. This process is very tedious and must be repeated many times to produce a satisfactory powder of uniform particle size. This lengthy process increases the cost of producing a powder of desired quality.

SUMMARY OF THE INVENTION

It is an object of this invention to improve the current rinsing, settling and decanting process to obtain a powder of a uniform particle size by adding to the initial rinse(s) a small amount of suitably charged material such as a quaternary ammonium compound which enables finer particles, which previously resisted suspension because they were bound to larger particles by electrostatic attraction, to be released due to dissipation of such electrostatic charges. The process of this invention improves the ability of fine particles to be individually suspended in the initial rinse(s) and substantially decreases the number of rinses necessary to produce a product of uniform particle size.

DESCRIPTION OF THE PREFERRED EMBODIMENT(S)

The process of this invention can be used with any powder-like material and the use of aluminum hydroxide particles is only an example of one type of particulate material. To create an alumina column such as described above, aluminum hydroxide is first rinsed with a liquid such as water containing a small amount of a quaternary ammonium compound causing some of the finer particles, which previously resisted suspension because they were bound to larger particles by electrostatic attraction, to be released from the larger particles. Since the quaternary ammonium compound dissipates the static charge which binds the finer particles to the large particles, the finer particles then float easily suspended in the liquid. It has been found that when an amount of hexadecyltrimethyl ammonium bromide, a quaternary ammonium compound representing 0.025% by weight of the total liquid, is added to each of the initial rinse(s) during the suspension of fine particles followed by settling of the uniform size particles and decanting of the suspended finer particles, the total number of rinses needed to reduce the content of fine particles or fines which are suspended in the water to an arbitrary preselected value determined by nephelometry of the rinse water is reduced from approximately twenty rinses to only seven or eight rinses to achieve the same result. This process is a significant advance in the art, saving much time and thus reducing the cost of the final product. Other quaternary ammonium compounds or suitably charged compounds can be utilized to similarly reduce the electrostatic attraction of the fine particles to the large particles. Since in some cases the presence of a quaternary ammonium compound might interfere with some of the desired future uses of the powder, it has been found desirable to use the quaternary ammonium compound only in the initial rinse(s) and to eliminate its use in later rinses so that the quaternary ammonium compound can be thoroughly removed from the resulting powder by the later rinses.

Although the present invention has been described with reference to particular embodiments, it will be apparent to those skilled in the art that variations and modifications can be substituted therefor without departing from the principles and spirit of the invention.

I claim:

1. A process for removing fine particles from larger particles in a powder by rinsing, comprising the steps of:

providing a liquid in a container having upper and lower portions;

adding a quaternary ammonium compound having a charge to said liquid;

placing said powder in said liquid;

reducing the static attraction of said fine particles to said larger particles by the action of said quaternary ammonium compound dissipating static attraction of said fine particles to said larger particles;

settling the larger particles in the lower portion of said container;

suspending the finer particles in said liquid in the upper portion of said container; and decanting said fine particles in said liquid from the upper portion of said container leaving the larger particles in the lower portion of said container.

2. The process of claim 1 wherein said quaternary ammonium compound is hexadecyltrimethyl ammonium bromide.

3. The process of claim 2 wherein said quaternary ammonium compound constitutes approximately 0.025% of the total amount of said liquid.

4. The process of claim 3 wherein said rinsing process of claim 1 is repeated a series of times and wherein said quaternary ammonium compound is added only to the liquid of the initial rinse(s) and not to later rinses.

* * * * *